(12) United States Patent
Brandt, Jr.

(10) Patent No.: US 6,679,125 B1
(45) Date of Patent: *Jan. 20, 2004

(54) FINE PARTICLE FLOWMETER

(76) Inventor: Robert O. Brandt, Jr., 2004 MacCumber La., Wilmington, NC (US) 28403

( * ) Notice: Subject to any disclaimer, the term of this patent is extended or adjusted under 35 U.S.C. 154(b) by 207 days.

This patent is subject to a terminal disclaimer.

(21) Appl. No.: 09/709,161

(22) Filed: Nov. 10, 2000

Related U.S. Application Data
(60) Provisional application No. 60/165,377, filed on Nov. 12, 1999.

(51) Int. Cl.$^7$ .................................................. G01F 1/28
(52) U.S. Cl. .................................................... 73/861.74
(58) Field of Search ..................... 73/861.71, 861.73, 73/861.74, 228, 61.75, 861.04; 222/1

(56) References Cited
U.S. PATENT DOCUMENTS 3,640,136 A * 2/1972 Nolte ........................ 73/228
4,583,660 A * 4/1986 La Barre et al. ............ 222/1
5,230,251 A * 7/1993 Brandt, Jr. .............. 73/861.72

* cited by examiner

Primary Examiner—Edward Lefkowitz
Assistant Examiner—Jewel V. Thompson
(74) Attorney, Agent, or Firm—Robert G. Rosenthal

(57) ABSTRACT

A flow meter for determining the flow rate or mass of a moving stream of fine particles comprises a guide means for guiding the material to be measured along a predetermined path having an entry end and an exit end. A transducer is operatively associated with one end of the guide means and includes a mechanical column connected between a load cell and the exit end of the guide means. The load cell produces an electrical output signal proportional to the flow rate of the material on the guide means. A means for vibrating the guide means is provided and serves to keep the flow stream moving and wherein the plane of vibration is perpendicular to the plane of measurement, thus eliminating measurement error due to the vibrational forces.

21 Claims, 12 Drawing Sheets

FINE PARTICLE FLOWMETER

This application claims the benefit of Provisional application Ser. No. 60/165,377, filed Nov. 12, 1999.

FIELD OF THE INVENTION

This invention relates generally to the field of weighing systems and more particularly to systems that weigh streams of fine powdered particles.

BACKGROUND OF THE INVENTION

It is known that the flow rate and mass of a stream of moving material such as a fluid or stream of particles can be very accurately measured using a flowmeter such as is disclosed in my prior U.S. Pat. No. 5,230,251 which is incorporated herein by reference. The aforementioned patent discloses a curved guide which is mounted for pivotal movement along which the fluid flows. The system generates an output signal which is proportional to the flow rate (or mass).

While the foregoing system works extremely well with materials that flow easily, it is a well known problem in the art that very fine powers normally do not flow smoothly enough to be measured by devices such as described above. Very fine particles (less than about 100 microns in diameter) have microscopic spurs on their surface and as the particle mass decreases, the surface area increases. When the spurs grapple each other clumping occurs and the flow stream becomes intermittent or is interrupted altogether.

In view of the foregoing, it would be of commercial value to provide a small particle flowmeter which would make the mass/flow rate thereof accurately measurable.

It is accordingly an object of present invention to provide an improved flowmeter.

Another object of the present invention is to provide a flowmeter through which fine particles flow.

Yet another object of the present invention is to provide a fine particle flowmeter which is reliable.

Still another object of the present invention is to provide a fine particle flowmeter that has a high degree of accuracy.

A still further object of the present invention is to provide a fine particle flowmeter which can be used both as a flowmeter and as a scale.

SUMMARY OF THE INVENTION

To accomplish the foregoing objects, there is provided an apparatus for measuring the flow rate of a stream of material composed of fine particles characterized by the ability to maintain an even flow of the material and to accurately measure the flow of the moving stream. The apparatus comprises an elongate guide means for guiding the stream of material along a predetermined path. The guide means includes an entry end and an exit end and is mounted for pivotal movement about a pivot point. In certain embodiments, the pivot point is located so that a line drawn through the pivot point and the guide is at right angles to the average centrifugal force component of the stream of material and further wherein the line is parallel to the average friction force component of the stream of material on the guide means. In addition, the pivot point is located outside and remote from the stream of material to produce an electrical output signal that is free of signals induced by friction and is an accurate representation of the flow rate of the stream of material. In addition, a transducer is operatively associated with the guide for converting the force exerted by the stream of material on the guide into an electrical signal representative thereof. Also provided is a vibration source for vibrating the guide to keep the particle stream moving and wherein the plane of vibration is perpendicular to the plane of measurement.

BRIEF DESCRIPTION OF THE DRAWINGS

Some of the features and advantages of the invention having been briefly described, others will appear from the detailed description which follows, when taken in connection with the accompanying drawings in which.

DETAILED DESCRIPTION OF THE PREFERRED EMBODIMENT

While the present invention will be described more fully hereinafter with reference to the accompanying drawings, in which a particular embodiment is shown, it is to be understood at the outset that persons skilled in the art may modify the invention herein described while still achieving the favorable results of this invention. Accordingly, the description which follows is to be understood as a broad teaching disclosure directed to persons of skill in the appropriate arts and not as limiting upon the present invention.

Figure 1:
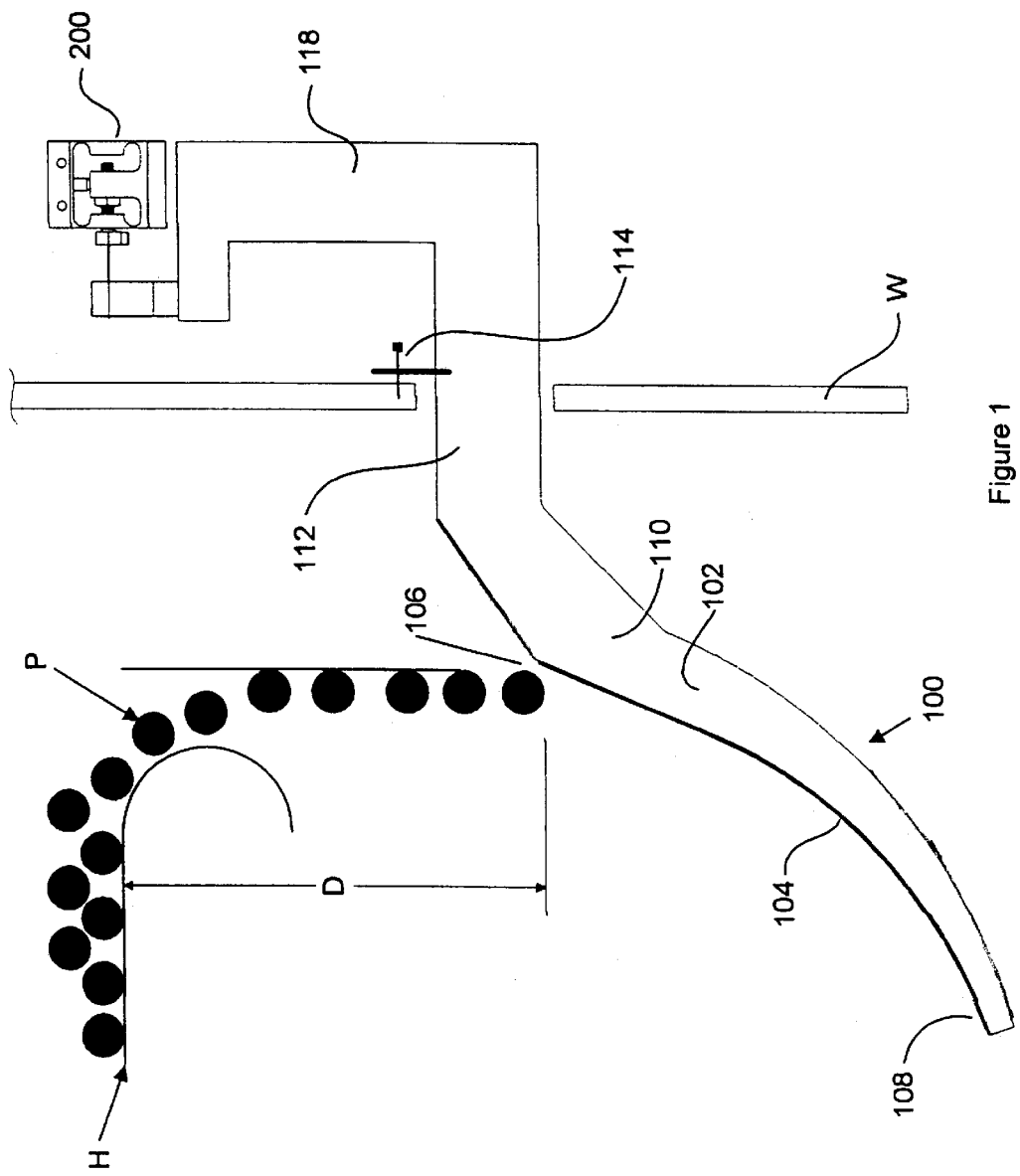
FIG. 1 is a schematic side view of the flow meter of the present invention and showing a hopper of fine particles comprising a flow stream to be weighed being dispensed on to the guide means.

Referring now to the FIG. 1, the flowmeter of the present invention is there illustrated. In that figure, a stream of material comprised of particles P is stored in a schematically shown dispensing hopper H that is positioned a predetermined distance D above the point of contact of the particles P on the flowmeter, generally indicated at 100. The flowmeter 100 comprises an elongate guide means 102 and a transducer means generally indicated at 200.

Figure 2:
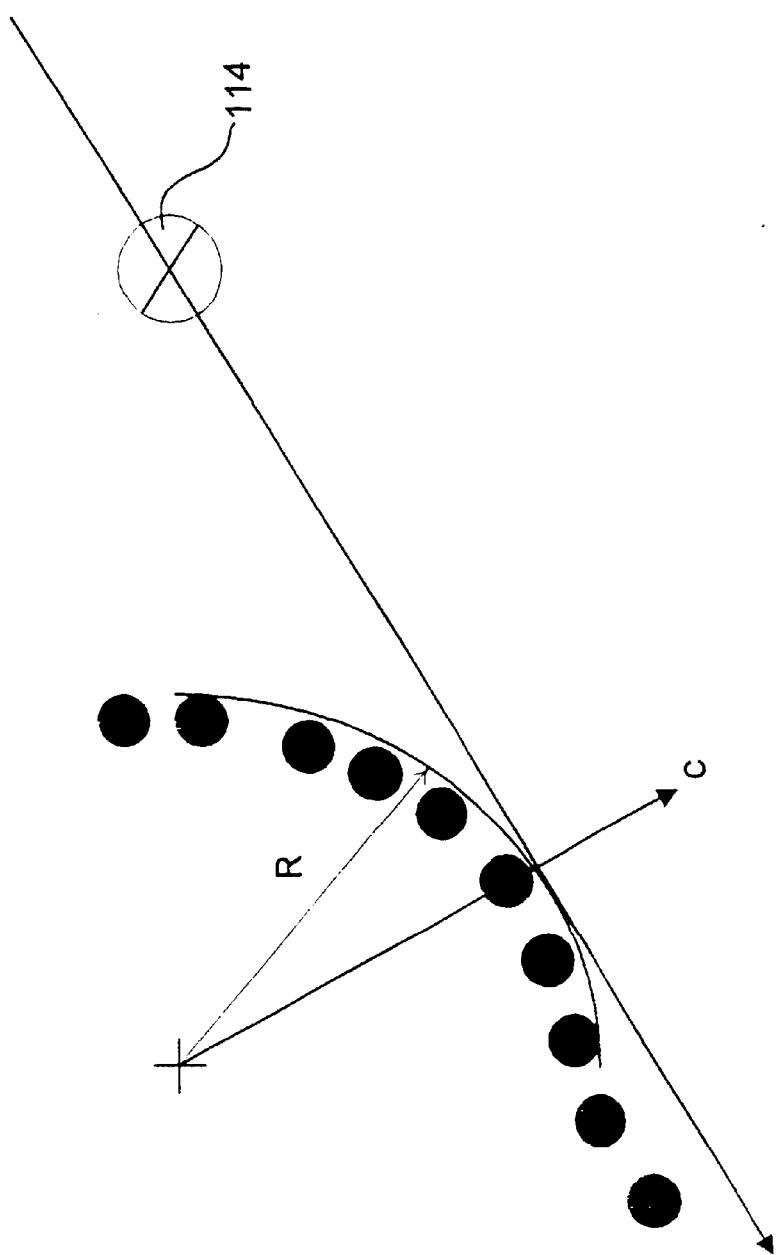
FIG. 2 is a schematic diagram illustrating the forces exerted on the guide means by particles being dropped onto and traveling along the guide means.
Figure 3:
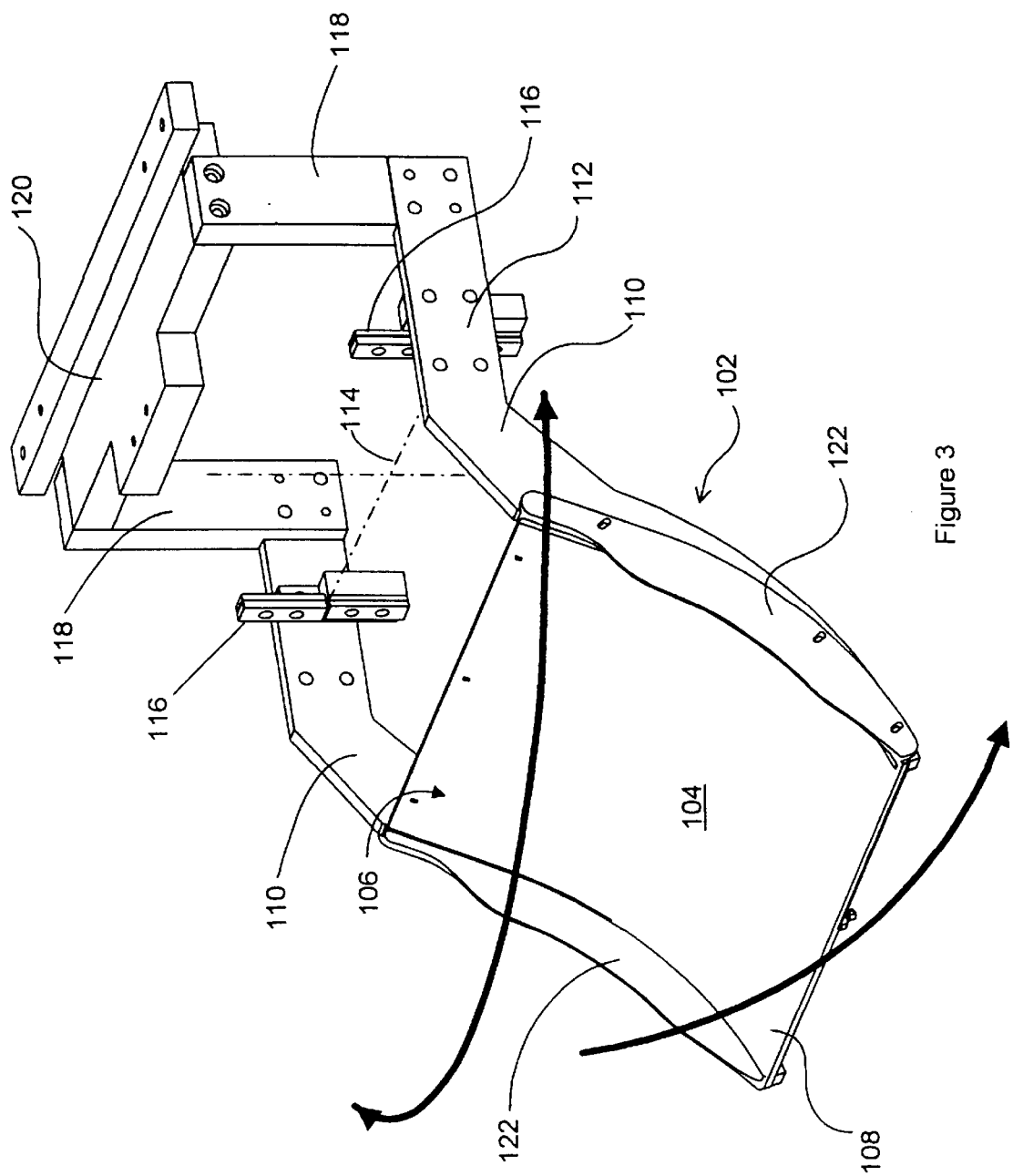
FIG. 3 is a front perspective view of the apparatus according to the present invention.
Figure 4:
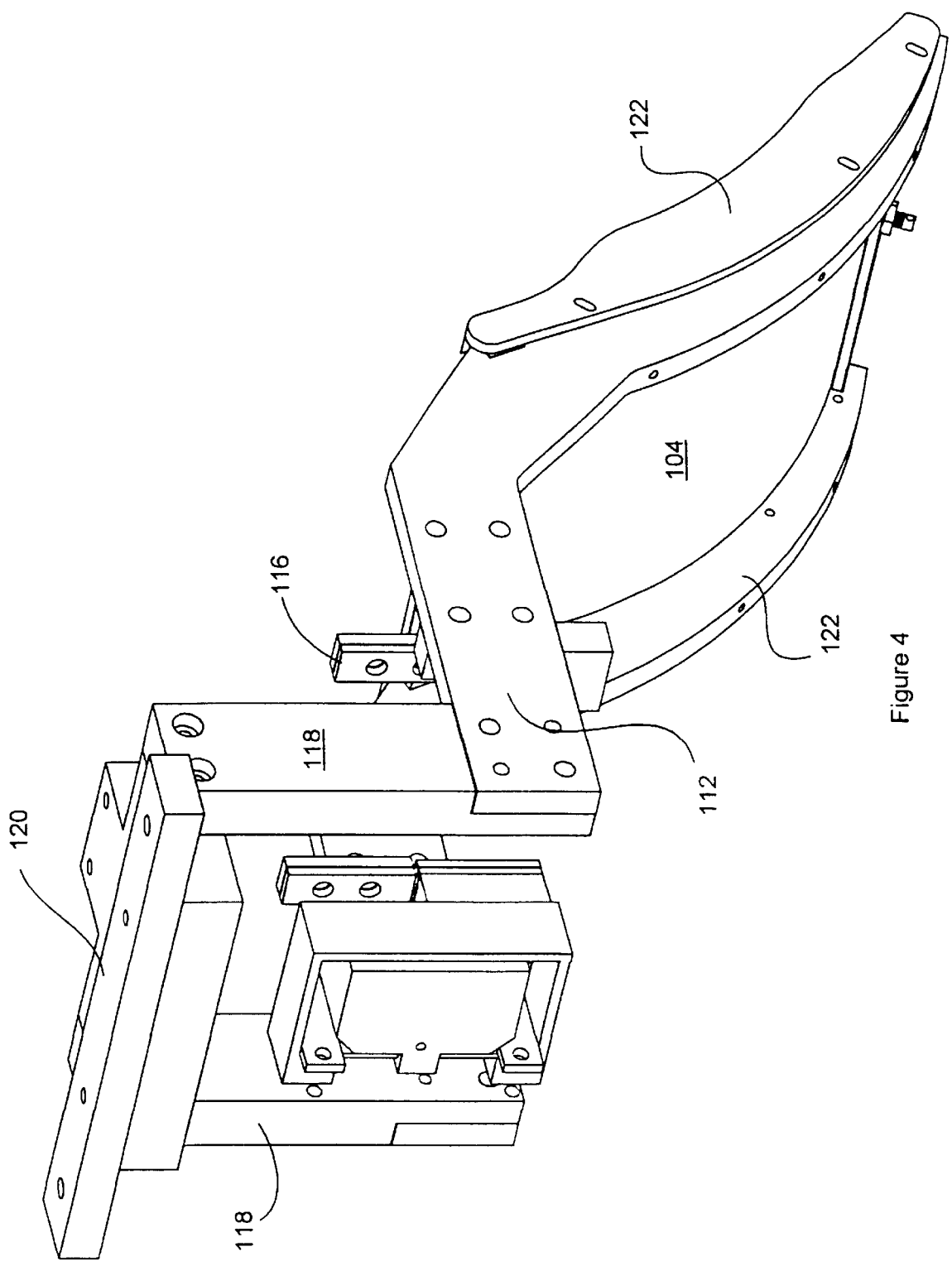
FIG. 4 is a rear perspective view of the apparatus according to the present invention.
Figure 5:
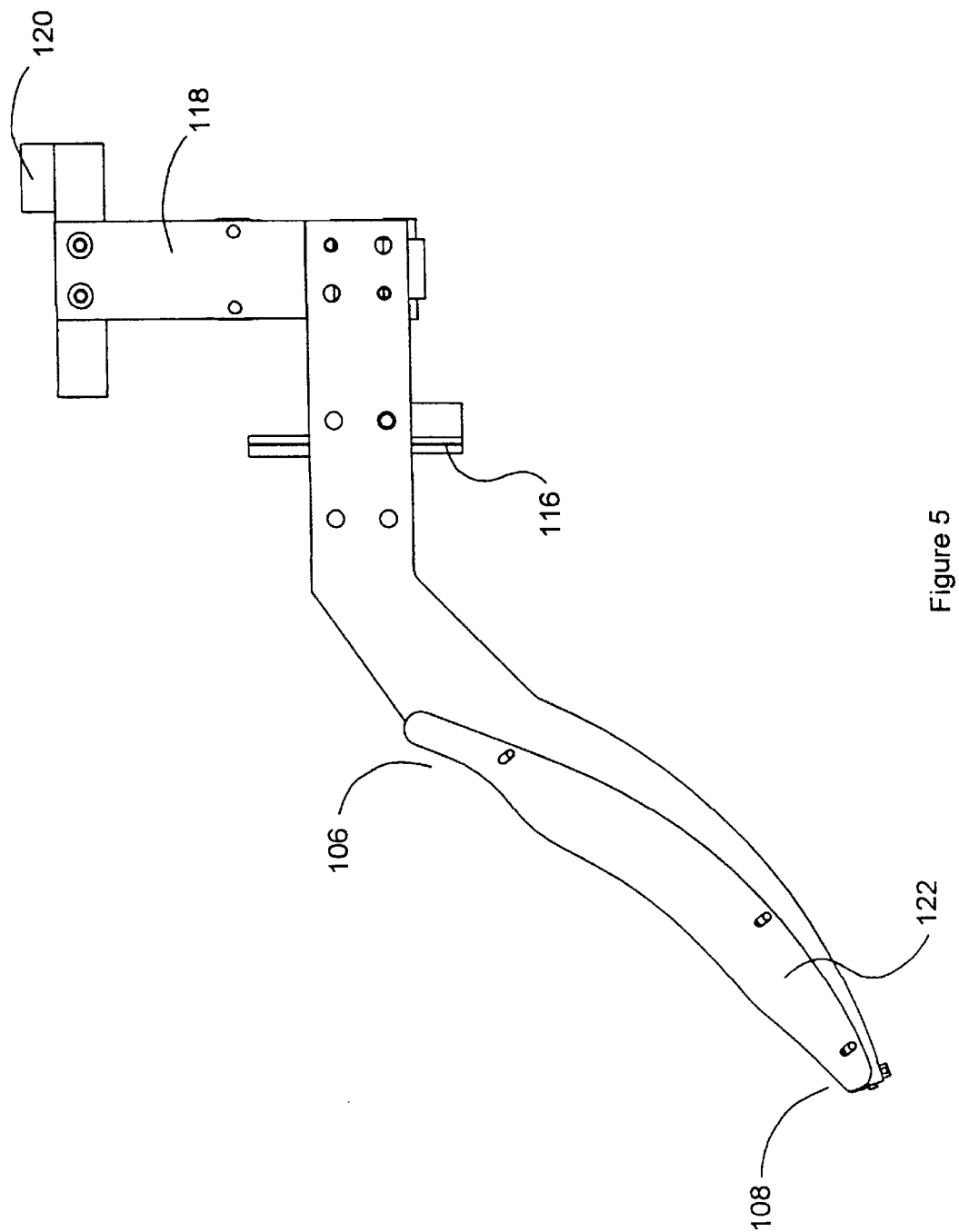
FIG. 5 is a side view of the apparatus according to the present invention.
Figure 6:
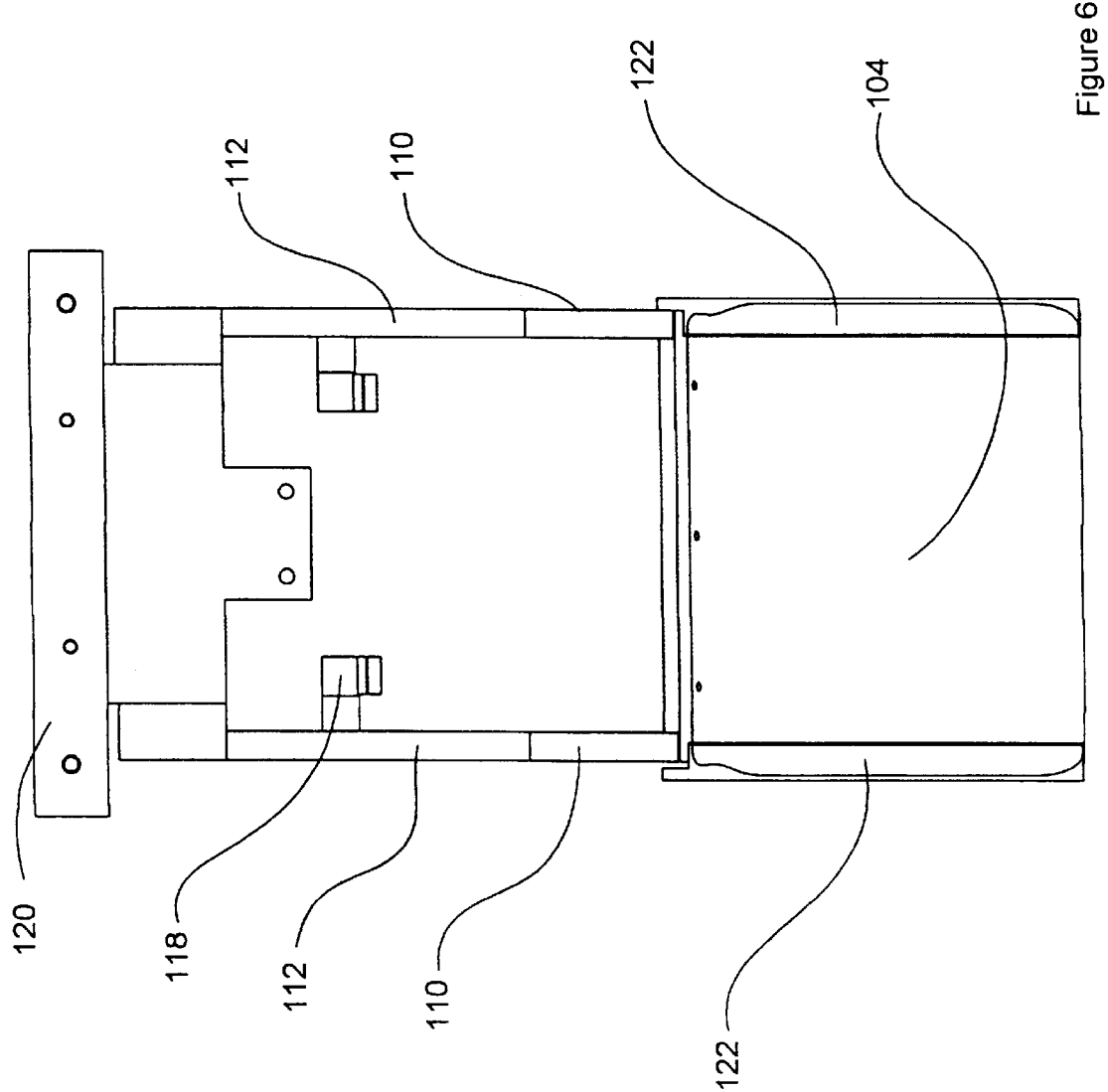
FIG. 6 is a top view of the apparatus according to the present invention.
Figure 7:
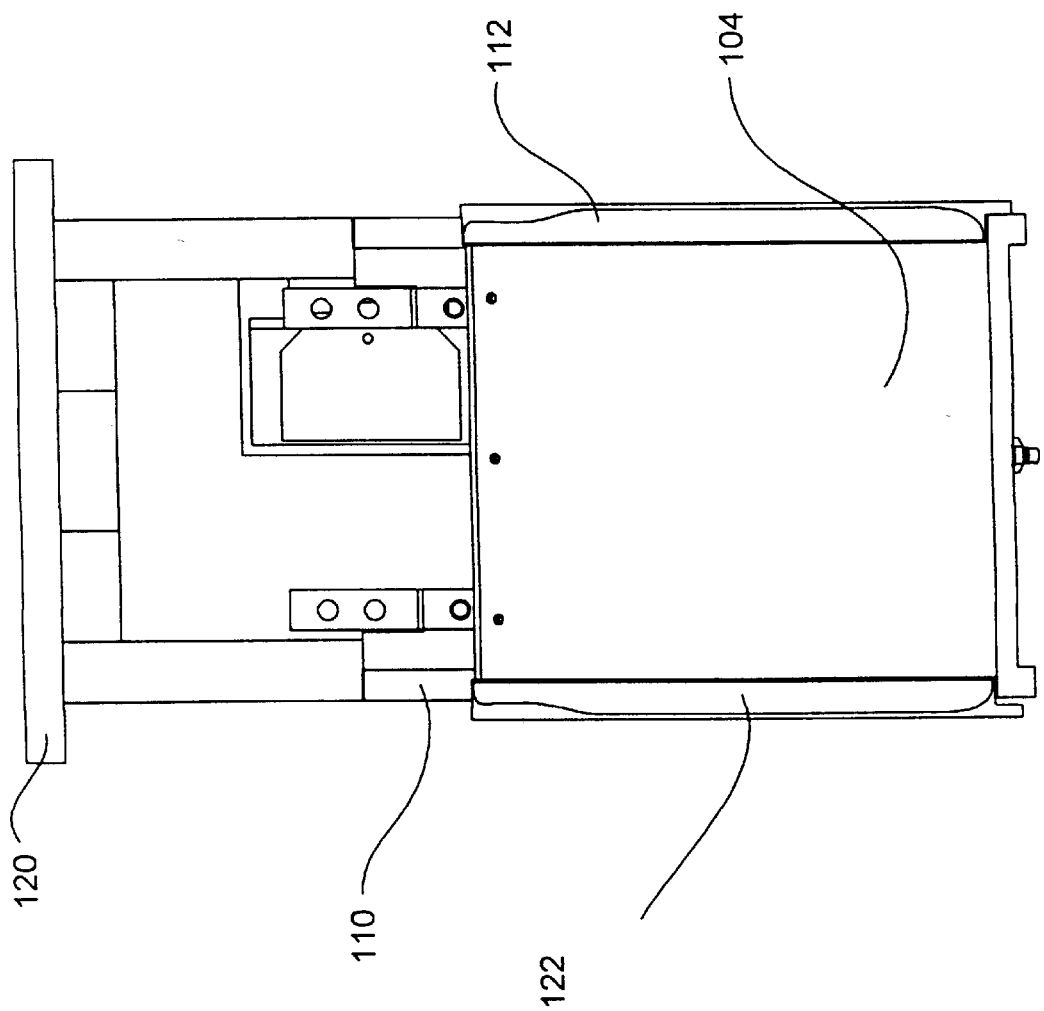
FIG. 7 is a front view of the apparatus according to the present invention.
Figure 8:
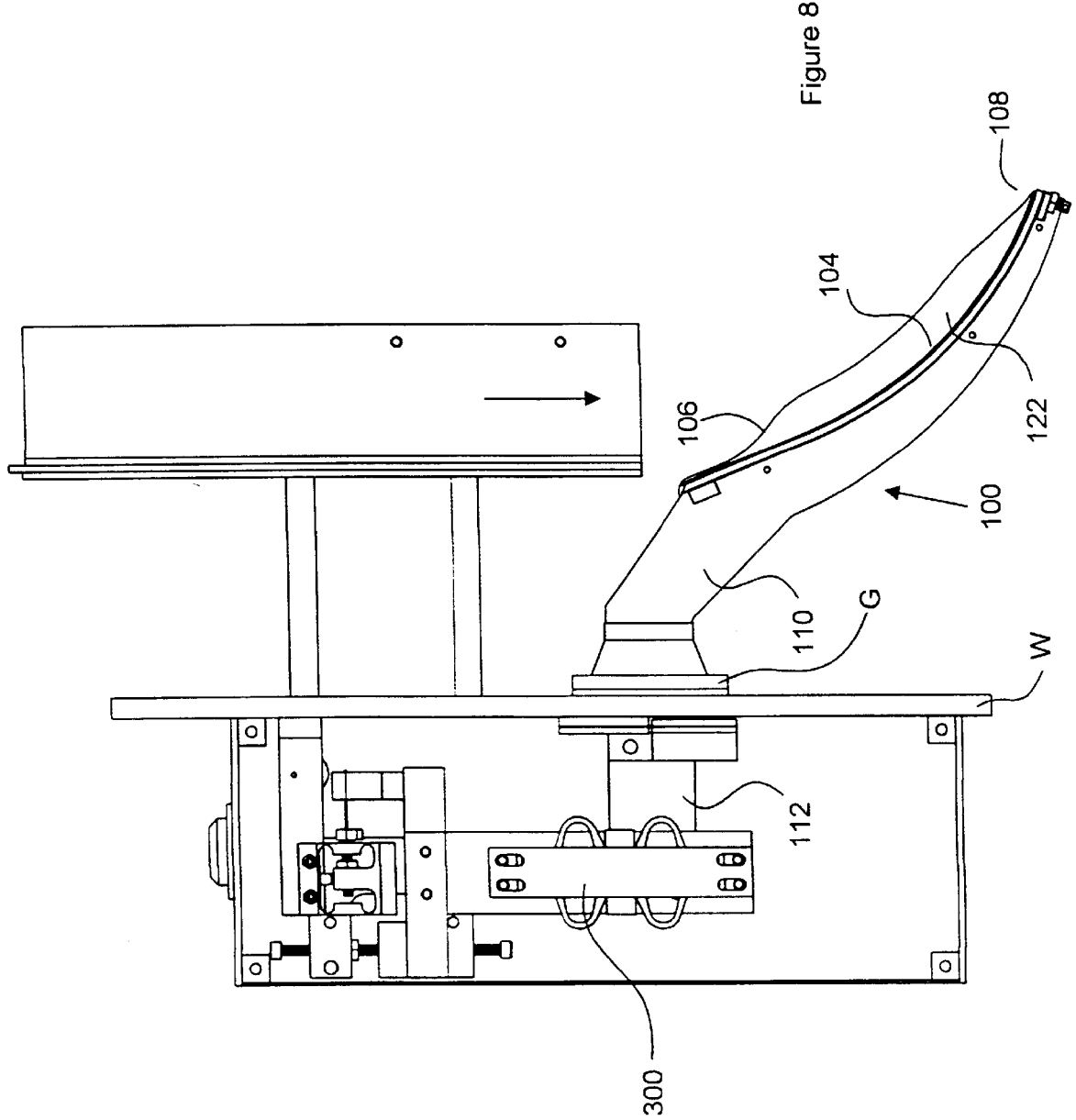
FIG. 8 is a sectional view of the apparatus according to the present invention showing the guide means on one side of a wall and the measurement portion of the apparatus on the opposite side.

The guide means or guide 102 is provided for guiding the stream of material along a predetermined path. The guide 102 includes a pan 104 having an entry end 106 and an exit end 108. The pan 104 is curved along the portion that extends between the entry and exit ends 106,108. In addition, a straight arm section 110 extends upwardly from the entry end 106 and which terminates in an extension arm 112 which has located along its length a pivot point 114. A pair of brackets 116 are connected to the extension arm 112 and are mounted to a wall W through which one end of the extension arm extends. An extension member 118 is connected at right angles to the end of each of extension arms 112 and a connecting member 120 is connected therebetween. The wall W (best shown in FIG. 8) is provided to separate the pan section which comes into contact with the flow stream from the measurement section. A gasket G can be placed around the extension arm 112 where it passes through wall W to physically separate the flow stream from the measurement apparatus. It is desirable to minimize the mass of the guide 102, and it is therefore preferably fabricated out of a sturdy lightweight material, such as aluminum, plastic, stainless steel, titanium etc. Also, it is necessary that the particles stay on the guide 102 as they move there along in order to maximize measurement accuracy side walls 122 are provided. An important feature of the guide 102 resides in the relation between the pivot point 114 and the tangential force component of the stream of material as it contacts and travels along guide 102. Specifically, the guide 102 is shaped so that a line drawn through the pivot point and the guide is at right angles to the average centrifugal force component C of the stream of material, the line being parallel to the average friction force component of the steam of material on the guide means, and further wherein the pivot point is outside of and remote from the stream of material on the guide. In this manner, the average friction force component of the particle traversing the guide is equal to an opposite the force exerted on the pivot, thus, canceling each other and yielding a force component that is related only to the mass of the stream of material. This principle is illustrated in the force diagram of FIG. 2. It is contemplated that the present invention may be incorporated into other systems wherein measurement is accomplished via means different from those employed herein, and that the pivot point need not be located as described hereinabove in order for the present invention to operate effectively.

Figure 9:
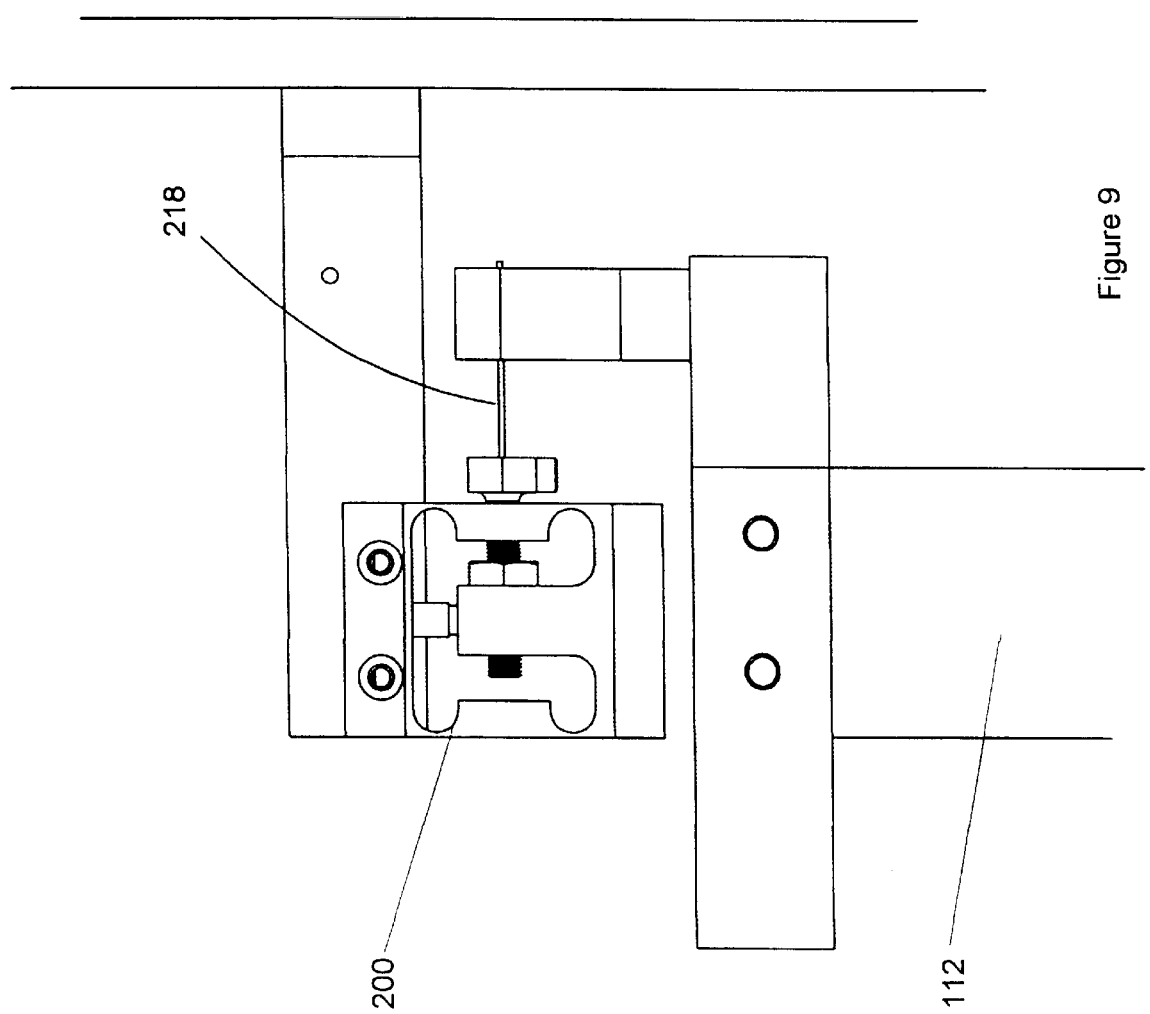
FIG. 9 is a side view of the transducer system according to the present invention.
Figure 10:
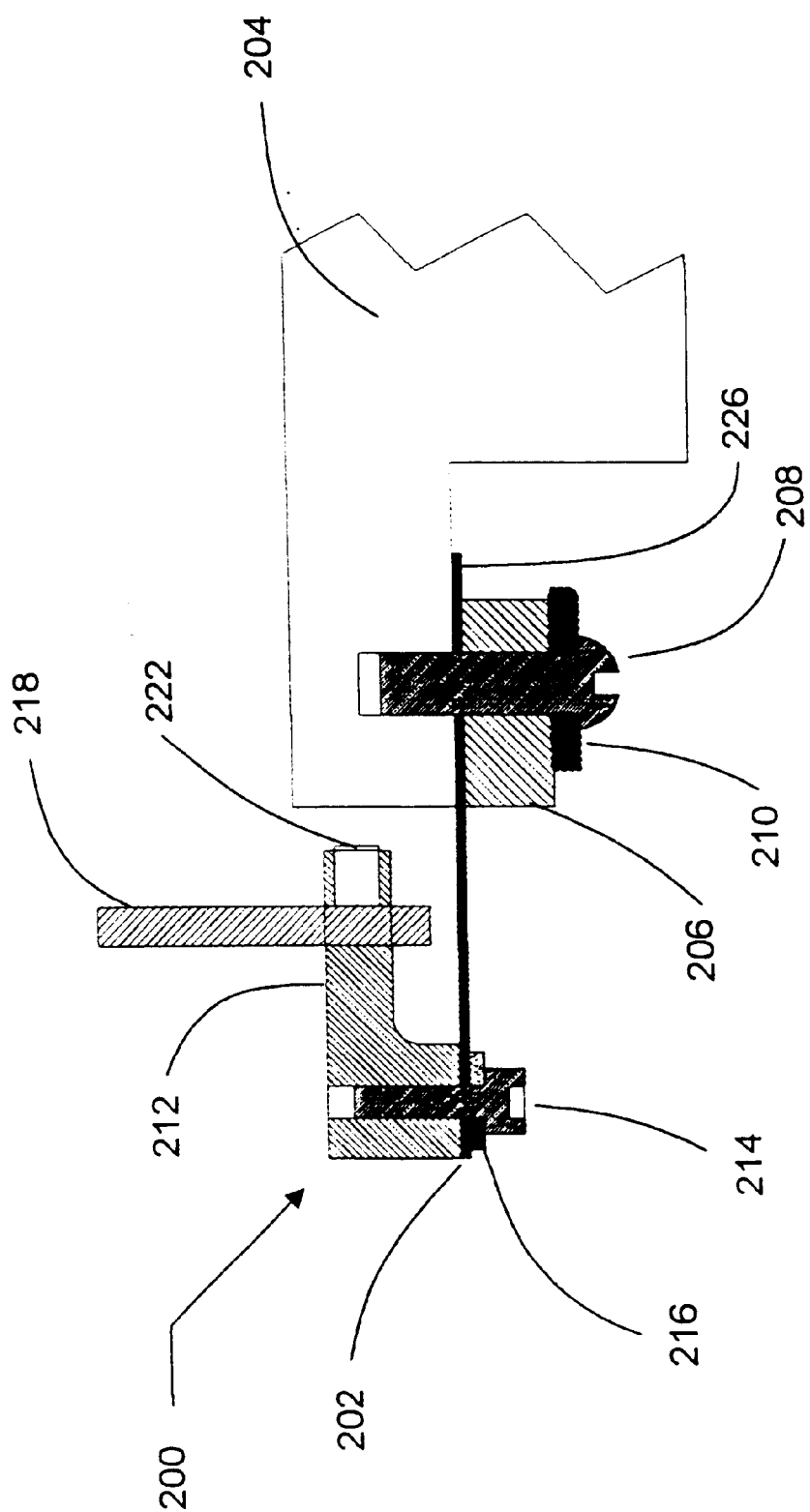
FIG. 10 is a side view of one embodiment the transducer means.

As best shown in FIG. 10, the weighing apparatus also includes a transducer means or force sensing system generally indicated at 200 operatively associated with the guide 102 for converting the force exerted by the stream of material on the guide into an electrical signal representative thereof. The transducer means includes a load cell means or weigh beam 202 that is secured to a mounting base 204 through a beam mounting block 206. An attaching screw 208 extends through beam mounting block 206 and with the assistance of a washer 210 secures beam mounting block 206 and beam 202 to the mounting base 204 of the force sensing/measurment system 200. The system as shown in FIG. 9 is similar to that shown in FIG. 10, except that deflection of the pan causes a pulling on column 218 which, in turn, results in deformation of a parallelogram type piezoelectric, i.e., strain gauge 224 which outputs a signal $V_o$ that is integrated and which correlates to the mass and/or flow rate.

Secured to the opposite end of the weigh beam 202 is a mounting bracket 212 which is secured to weigh beam 202 via screw 214 and associated washer 216.

A column means or displacement transfer link 218 is provided for communicating the force exerted by the stream of material on the guide 102 to the load cell. The column has a first end that is connected to the guide proximate the end of extension arm 112 and a second end that is adjustably mounted with bracket 220 by set screw 222. Column 218 extends upwardly over the central portion of the weigh beam 202. This arrangement is commonly referred to as an S-loaded weigh beam which yields greater force multiplication as bending of the beam affects two locations and, therefore, exaggerates loading on the sensor as will be more fully described hereinbelow. It will be noted, that the benefits and advantages of the present invention can be achieved with equal efficacy when other beam loading arrangement such as cantilevers are employed.

Figure 11:
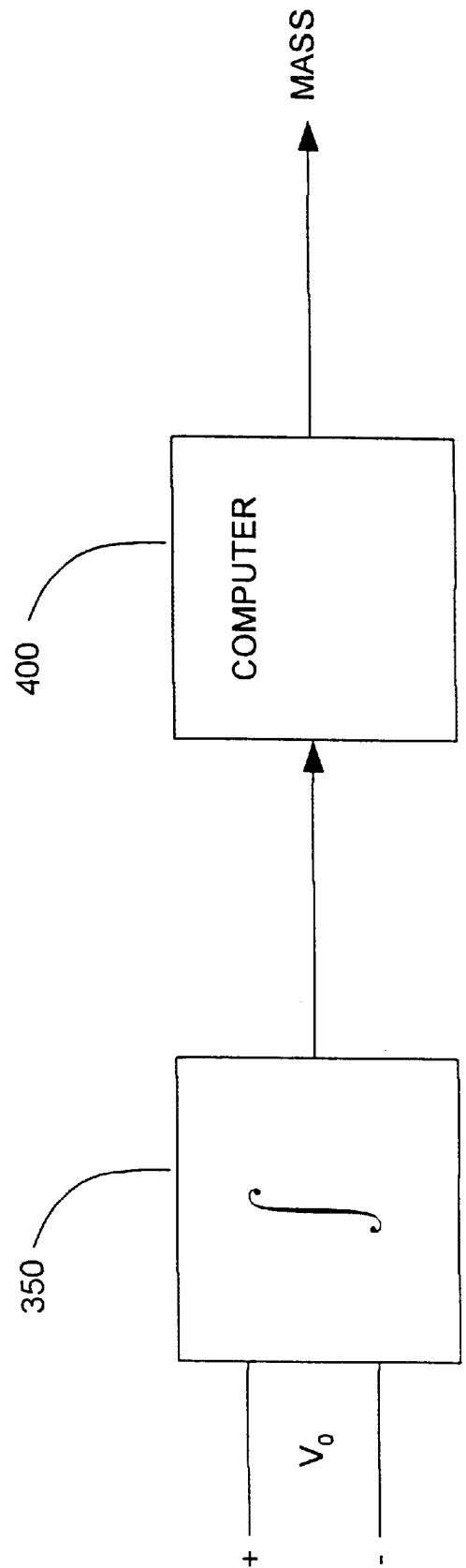
FIG. 11 is a schematic diagram of the transducer output signal being integrated to calculate the mass or flow rate of particles being conveyed according to the present invention.
Figure 12:
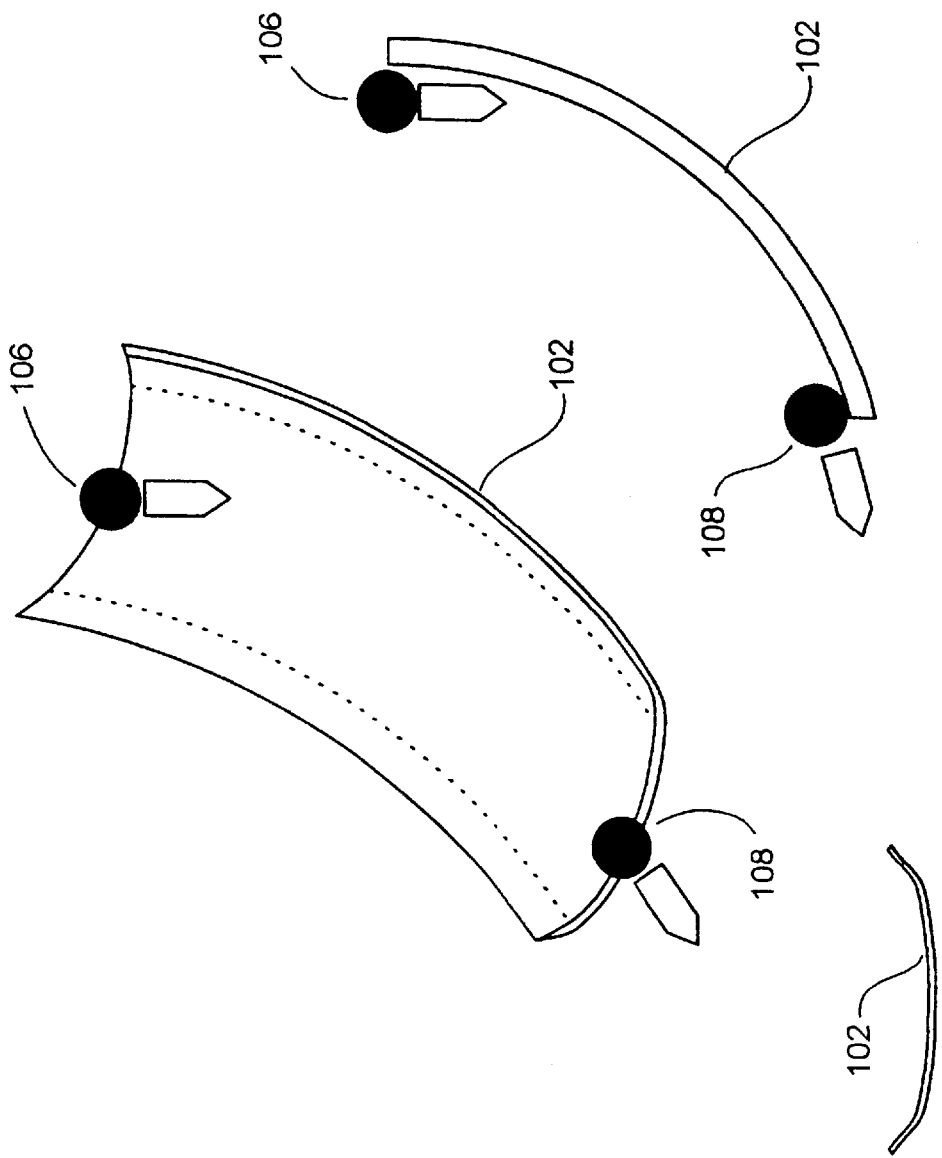
FIG. 12 is a perspective view of the pan according to the present invention.

Turning now to FIGS. 9 through 11, the load cell or weigh beam 202 according to the present invention is there illustrated. The load cell 202 is characterized by its ability to accurately measure applied forces greater than about two milliseconds. And to produce an output signal that is a function of the applied force that is substantially free of resonant vibration. The transducer 200 comprises substrate or beam member 202 and a strain gauge 224.

The beam member 202 comprises an elongate substantially flat substrate having a first surface 202a and a second surface 202b.

A strain gauge means or strain gauge 224 is mounted to one of the surfaces (in the illustrated embodiment surface 202a). The preferred strain gauge is a semiconductor or metal foil Wheatsone bridge, well known to those skilled in the art. The strain gauge and beam member units are usually purchased preassembled as an off the shelf unit from suppliers such as Omega electronics (see for example, part numbers LCL 454G and LCL 113G). As the Wheatstone bridge generates four output signals, four output wires 226 are provided.

A means for vibrating the guide or vibrator 300 is connected by conventional means to member 118. A hopper vibrator such as is available from Cleveland Vibrator of Cleveland, Ohio may be employed. The vibrator 300 is mounted such that the plane of vibration is 90 degrees, i.e., perpendicular to the force exerted by the stream of material on the transducer means, thereby defining a plane of measurement. The vibrational energy produced keeps the particles from sticking to one another and the placement of the plane of vibration perpendicular to the plane of measurement prevents error from being introduced into the weight and/or flow rate measurement. The vibrator is tuned to vibrate at a preselected resonating frequency which is a multiple of the line frequency, as determined by the selected input voltage. It will be evident to those skilled in the art that the vibrator may be incorporated into other mass/flow rate measurement systems.

In operation, the particles P in the stream of material are dispensed from the hopper or other dispensing apparatus on to the guide means 102 and contact tangentially thereon. This causes a slight flexure at the pivot point and movement of extension arm 112 which, in turn, is transmitted through the column 218 to the load cell causing a proportional deformation of weigh beam 202. The deformation of weigh beam 202 then causes a similar deformation in the strain gauge 224 which produces an electrical output signal Vout in lines 226 that is proportional to the force exerted on guide 102. This electrical signal is then integrated in integrator 350 and output to a computing means or computer 400 in order to calculate the mass of the stream of material according to methods well known to those skilled in the art.

In another application of the present invention, the apparatus described above may also be employed as a continuous flowmeter. Instead of a weighable unit being dispersed on to the guide means 102, the guide means is subjected to a continuous flow of material. If the flow of the material is constant, the column 218 will deform proportionally and similarly will cause a steady-state (constant) output signal Vout to be output on lines 226 from the load cell. Any variation in flow rate will be observed as a variation in output signal Vout. This, Vout may be digitally sampled and the information output to a control device such as a computer 400 that can be used to adjust the system as needed in order to return to the optimal flow rate.

The foregoing embodiments and examples are to be considered illustrative, rather than restrictive of the invention, and those modifications which come within the meaning and range of equivalence of the claims are to be included therein.

That which is claimed is:

1. An apparatus for measuring the flow rate of a stream of material composed of fine particles, characterized by the ability to maintain an even flow of the material and to accurately measure the flow rate thereof and comprising:
   an elongate curved guide means for guiding the stream of material along a predetermined path, said guide means including an entry end and en exit end, said guide means being mounted for pivotal movement about a pivot point; and
   wherein said pivot point is located so that a line drawn through said pivot point and the guide means is at right angles to the average centrifugal force component of the stream of material, said line being parallel to the average friction force component of the stream of material on the guide means, and further wherein said pivot point is outside of and remote from the stream of material to produce an electrical signal output that is free of signals induced by friction and is an accurate representation of the flow rate of the stream of material;
   a transducer means operatively associated with said guide means for converting the force exerted by the stream of material on the guide means into an electrical signal representative thereof; and
   a means for vibrating said guide means such that the plane of vibration is perpendicular to the force exerted by the stream of material on the transducer means, thereby defining a plane of measurement;
   whereby the vibration maintains the material flowing along the guide means.

2. The flow meter according to claim 1 further including a computing means for calculating the flow rate of the stream of material.

3. The flow meter according to claim 1 wherein the stream of material enters the guide means proximate its entry end such that the point of initial contact is tangential thereto.

4. The flow meter according to claim 1 wherein the means for vibrating induces vibration of the guide means a resonating frequency.

5. The flow meter according to claim 1 wherein said transducer means comprises:
   (a) a load cell means for converting an input signal in the form of an applied mechanical force into an electrcial output signal that is a function of the applied mechanical force; and
   (b) a column means for communicating the force exerted by the stream of material on said guide means to said load cell means, said column means having a first end and a second end, the first end of said column being connected to said guide means, and the second end thereof being operatively associated with said load cell means.

6. The flow meter according to claim 5 wherein the first end of said column means is connected proximate the entry end of said guide means.

7. The flow meter according to claim 5 wherein said load cell comprises:
   (a) an elongate substantially flat substrate having a first surface and a second surface; and
   (b) a strain gauge means mounted to one of said surfaces, said strain gauge means including output means for providing an electrical output signal as a function of the force applied to said substrate.

8. The flow meter according to claim 7 further including a damping means coating at least a portion of one of said surfaces;
   whereby the applied force acting to deform the load cell is translated into an electrical output signal that is a function of flow rate and being substantially free of resonant vibration.

9. The flow meter according to claim 8 wherein said strain gauge means produces an electrical output signal that is substantially proportional to the force applied to said substrate.

10. The flow meter according to claim 7 wherein said strain gauge comprises a metal foil strain gauge.

11. The flow meter according to claim 7 wherein said strain gauge means comprises a semiconductor strain gauge.

12. The flow meter according to claim 7 wherein the strain gauge compries a sputtered strain gauge.

13. The flow meter according to claim 7 wherein the strain gauge comprises a bridge circuit.

14. The flow meter according to claim 7 wherein said damping means comprises a viscoelastic polymer.

15. The flow meter according to claim 6 further including a second substrate and wherein said damping means is positioned in sandwhich fashion between said substrate and second substrate and bonding said substrates together.

16. A flow meter for measuring a moving stream of particles characterized by the ability to maintain the flowability of the stream and accuracy of measurement and comprising:
   an elongate curved guide means for guiding the stream of material along the guide the means, said guide means having an entry end and an exit end and being mounted for pivotal movement about a pivot point; and
   wherein said pivot point is located so that a line drawn through said pivot point and the guide means is at right angles to the average centrifugal force component of the stream of material, said line being parallel to the average friction force component of the stream of material on the guide means, and further wherein said pivot point is outside of and remote from the stream of material on the guide means to produce an electrical signal output that is free of signals induced by friction and is an accurate representation of the flow rate of the stream of material;
   a mechanical column having a first end and a second end, the first end of said column being connected proximate the entry end of the guide means;
   a load cell having a proximal end and a distal end for converting an applied mechanical force to an electrical signal proportional to the applied mechanical force, and wherein the distal end of said load cell is operatively associated with the second end of said mechanical column an the proximal end of said load cell is adapted to be connected to a mounting block; and
   a means for vibrating the guide means such that the plane of vibration is perpendicular to the force exerted by the stream of material on the transducer, thereby defining a measurement plane;

whereby the vibration keeps the flow stream from sticking while keeping the vibration from inducing measurement error.

17. An apparatus for measuring the flow rate of a stream of a material composed of fine particles, characterized by the ability to maintain an even flow fo the material and to accurately measure the flow rate thereof and comprising:

an elongate curved guide means for guiding the stream of material along a predetermined path, said guide means including an entry end and an exit end, said guide means being mounted for pivotal movement about a pivot point; and a transducer means operatively associated with said guide means for converting the force exerted by a stream of material on the guide means into an electrical signal representative thereof; and a means for vibrating said guide means such that the plane of vibration is perpendicular to the force exerted by the stream of material on the transducer, thereby defining a plane of measurement;

whereby the vibration maintains the material flowing along the guide means.

18. The flow meter according to claim 17 further including a computing means for calculating the flow rate of the stream of material.

19. The flow meter according to claim 17 wherein the stream of material enters the guide means proximate its entry end such that the point of initial contact is tangential thereto.

20. The flow meter according to claim 17 wherein the means for vibrating induces vibration of the guide means a resonating frequency.

21. The flow meter according to claim 17 wherein said transducer means comprises:

(a) a load cell means for converting an input signal in the form of an applied mechanical force into an electrical output signal that is a function of the applied mechanical force; and (b) a column means for communicating the force exerted by the stream of material on said guide means to said load cell means, said column means having a first end and a second end, the first end of said column being connected to said guide means, and the second end thereof being operatively associated with said load cell means.

* * * * *